US010072915B2

United States Patent
Medina et al.

(10) Patent No.: US 10,072,915 B2
(45) Date of Patent: Sep. 11, 2018

(54) METHOD AND DEVICE FOR CONNECTING AND SEPARATING TWO ELEMENTS, WITH CONNECTING PLATES

(71) Applicant: Airbus Defence and Space SAS, Les Mureaux (FR)

(72) Inventors: Felipe Medina, La Celle-Saint-Cloud (FR); Luc Preaud, Gargenville (FR)

(73) Assignee: Airbus Defence and Space SAS, Les Mureaux (FR)

( * ) Notice: Subject to any disclaimer, the term of this patent is extended or adjusted under 35 U.S.C. 154(b) by 110 days.

(21) Appl. No.: 14/908,746

(22) PCT Filed: Jul. 31, 2014

(86) PCT No.: PCT/EP2014/066506
§ 371 (c)(1),
(2) Date: Jan. 29, 2016

(87) PCT Pub. No.: WO2015/014943
PCT Pub. Date: Feb. 5, 2015

(65) Prior Publication Data
US 2016/0195378 A1    Jul. 7, 2016

(30) Foreign Application Priority Data

Aug. 1, 2013  (FR) ...................................... 13 57639

(51) Int. Cl.
*F42B 15/38*    (2006.01)
*B64G 1/64*    (2006.01)

(52) U.S. Cl.
CPC .............. *F42B 15/38* (2013.01); *B64G 1/641* (2013.01); *B64G 1/645* (2013.01)

(58) Field of Classification Search
CPC .......... B64G 1/641; B64G 1/645; F42B 15/38
See application file for complete search history.

(56) References Cited

U.S. PATENT DOCUMENTS 3,427,047 A * 2/1969 Mayo .................... F16L 37/148
102/378
4,648,227 A * 3/1987 Reusch .................... B64D 1/00
102/378

(Continued)

FOREIGN PATENT DOCUMENTS

FR          2947808          1/2011
JP        2002211500         7/2002

(Continued)

OTHER PUBLICATIONS

French Search Report, dated May 15, 2014, priority document.

(Continued)

*Primary Examiner* — Valentina Xavier
(74) *Attorney, Agent, or Firm* — Greer, Burns & Crain, Ltd.

(57) ABSTRACT

A method and device enable the linear separation of two elements attached to each other, through two respective connecting surfaces of these two elements. A connecting layer is placed between both connecting parts. Thermite is used to melt this connecting layer. The thermite can be placed on the other side of the first connecting part towards the first element, a heat protecting plate completing this assembly. The thermite can also be placed in grooves provided on the connecting surface of the second connecting plate to be directly in contact with the connecting layer.

10 Claims, 5 Drawing Sheets

(56) References Cited

U.S. PATENT DOCUMENTS

| | | | | |
|---|---|---|---|---|
| 5,402,728 A * | 4/1995 | Garner | ............. | B64G 1/645 |
| | | | | 102/223 |
| 2008/0163748 A1 * | 7/2008 | Facciano | ............. | F42B 15/38 |
| | | | | 89/36.01 |
| 2012/0110823 A1 | 5/2012 | Behar | | |

FOREIGN PATENT DOCUMENTS

| | | |
|---|---|---|
| WO | 2007094801 | 8/2007 |
| WO | 2011003965 | 1/2011 |

OTHER PUBLICATIONS

"Pyrotechnic shaped charge separation systems for aerospace vehicles", F.Z. Smith, NASA Technical Memorandaum, Jul. 1, 1968.
International Search Report, dated Nov. 27, 2014.

* cited by examiner

METHOD AND DEVICE FOR CONNECTING AND SEPARATING TWO ELEMENTS, WITH CONNECTING PLATES

CROSS-REFERENCES TO RELATED APPLICATIONS

This application claims the benefit of the French patent application No. 1357639 filed on Aug. 1, 2013, the entire disclosures of which are incorporated herein by way of reference.

BACKGROUND OF THE INVENTION

The invention relates to a linear separation, as smooth as possible, of a first element with respect to a second element, which are rigidly connected beforehand. The invention is preferably applicable to spatial launchers, for separating stages from each other, of a launcher and of its cap or a stage and the payload, of missiles, space probes, or even planes, in the case of a payload release. The purpose of this separation is to reduce the weight of the on-board assembly, or to release a payload. These applications are characterized in that there is a need for separating objects that may be fragile, for example a satellite, and the connection of which has had to undergo high mechanical loads, as those undergone when propelled by a launcher.

Figure 1A:
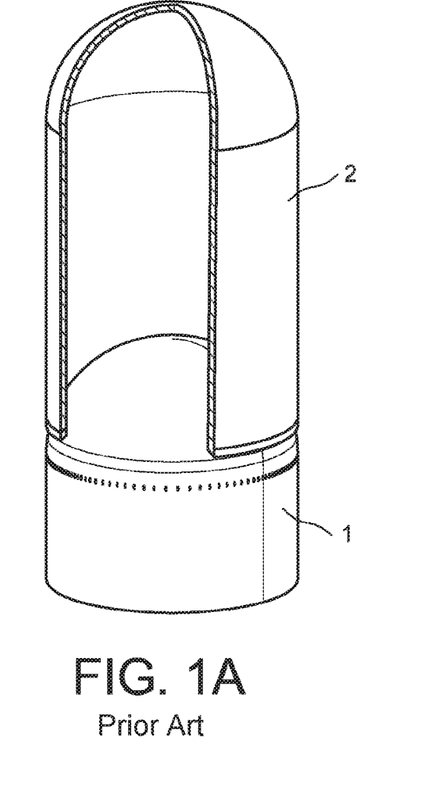
FIGS. 1A and 1B, two schemes representing the separation of two elements in a launcher.
Figure 1B:
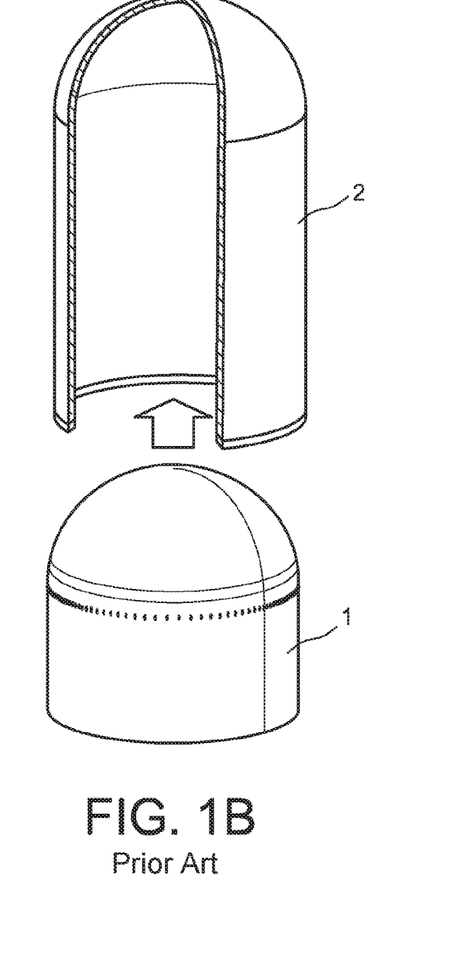

FIGS. 1A and 1B illustrate the principle of separation between two elements 1 and 2 of a launcher. The first element 1 is preferably an element with the rank n, preferably a first engine stage. The second element is an element with the rank n+1, either a second engine element, or a payload, for example a satellite. The linear separation, in the launcher axis, thus has to be carried out without deteriorating the base of the second element and, in the case where it is desired to recover the first element 1, without deteriorating the surface thereof, where the connection between both these elements 1 and 2 was located.

In the current state of the art, the connecting/separating system is mostly of four types, which are the following ones:

1) the connections by bolting, riveting and pyrotechnic cutting off by pressure and local temperature rise of the structure. These systems, due to their operation, generate ejected material debris. Moreover, the cutting off causes a significant impact in the structure, which may be damageable for the payloads of the launcher;

Patent document FR 2,947,808 shows an example of implementing such a solution.

2) The connections by bolting, riveting and pyrotechnic cutting off by rupturing the structure, through the deformation of a pyrotechnic element. This solution is the most employed and does not generate debris, but causes a very significant impact;

3) the connections by pyrotechnic bolting and rupturing or separating the nut. This type of solution generates much less impact than the two previous ones, but requires several bolts to transmit strains from one element to the other, thus generating higher failure risks because of the number of devices involved;

4) the connections by straps and rupturing the same by pyrotechnic bolts. This type of solution does not enable high strains to be transmitted between both elements and does not allow for too large of diameters for the launchers. Also in this case, the stress relief causes a high impact in the structures.

Generally, in the current state of these techniques, systems coming from these connecting-separating solutions have the feature to leave, most of the time, asperities on the external shape of the launcher, after the separation.

The purpose of the invention is to overcome the above-mentioned drawbacks.

SUMMARY OF THE INVENTION

To that end, a first main object of the invention is a method for connecting and separating two elements connected to each other by a defined local connection, and that have to be securely separated, the separation occurring by a quick and partial warming up, at or near the connection, the warming-up being remotely triggered.

According to the invention, the method comprises the following steps of:

connecting the first and second elements through two connecting plates, respectively attached to the first element and the second element, with the connecting means placed between both these respective connecting surfaces of these two connecting plates of thermite, inflammable by an electrical control connection, being placed close to the connecting means; and triggering the thermite by an electrical command to cause, only by its warming-up, the quick warming-up, and not the explosion, and the destruction of the connecting means.

A second main object of the invention is a device for connecting and separating two elements, a first element and a second element, connected to each other by a defined local connection, and that have to be securely separated, the separation occurring at the connection, this warming-up being remotely triggered.

According to the invention, the device comprises:

a layer for connecting the first element and the second element, this connecting layer being placed between two connecting plates of the first element and the second element respectively;

thermite, placed close to the connecting layer; and means for remotely pyrotechnically triggering the thermite.

A first embodiment of the device contemplates the placement of the thermite on a first surface, called a material surface, of a first of both connecting plates, this material surface being opposite to a second surface, called a connecting surface, of this first connecting part and which is in contact with the connecting means.

In this case, preferably, a heat protecting plate, completed by a cap, both placed between the first connecting plate carrying the thermite and the first element are used.

In another embodiment of the device, the thermite is placed in grooves provided on the connecting surface of the second connecting plate.

Preferably, the connecting plates are attached to their respective element by bolting.

The connecting means can comprise glue, or soldering.

A third main object of the invention is an aeronautic launcher comprising a first carrier stage and a second stage carried by the first carrier stage, both these stages being linearly connected and having to be linearly separated, the launcher comprising a plurality of devices such as previously described, distributed over the entire circumference of the launcher, between both stages, to secure and separate these stages, the first element of each preceding device being the wall of the first carrier stage, the second element of each preceding device being the wall of the second carried stage.

In a first embodiment of such a launcher, the first of both connecting plates has a first inner land laterally extending by pressing against one end of the connecting plate, and has two second outer lands for surrounding the heat protecting plate and the cap.

In a second embodiment of the launcher, the second connecting plate has an inner land laterally extending pressing against one end of the first connecting plate.

BRIEF DESCRIPTION OF THE DRAWINGS

The invention and its technical characteristics will be better understood upon reading the following description, which is accompanied with fourteen figures, respectively representing.

DETAILED DESCRIPTION OF THE PREFERRED EMBODIMENTS

Figure 2:
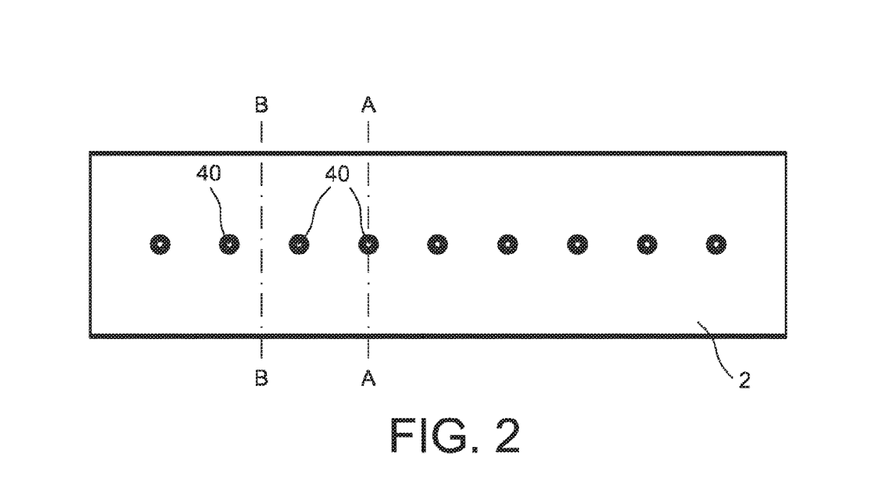
FIG. 2, a side view of the device according to the invention.

FIG. 2 enables to better locate, the one with respect to the other, FIGS. 3A and 3B relative to the embodiment first described of the invention, but it will be discussed later.

Figure 3A:
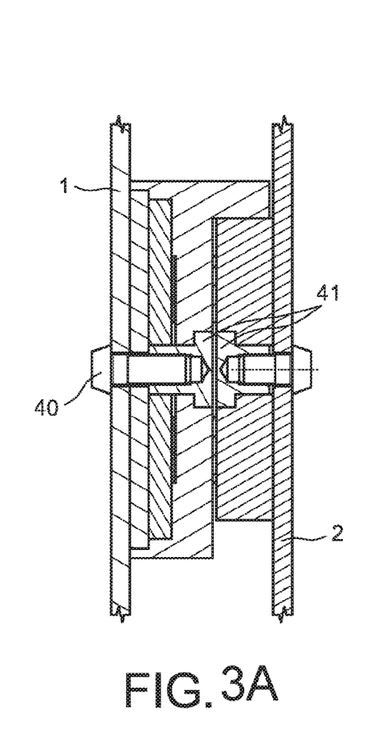
FIGS. 3A and 3B, two different cross-sections of the device according to the invention, in a first embodiment.
Figure 3B:
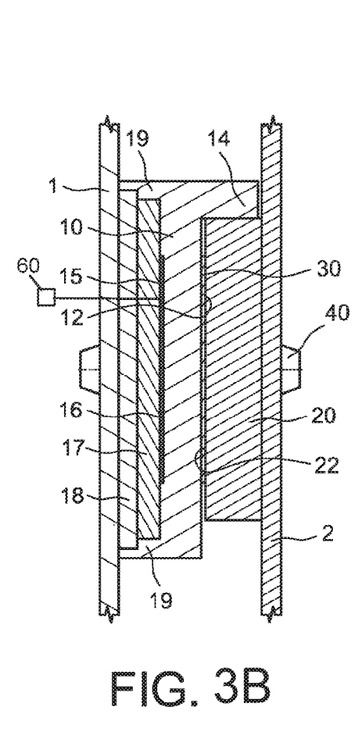

In both FIGS. 3A and 3B, element 1 and element 2, which are to be assembled and separated thereafter, are each represented by a plate which each makes up the outer structure of two launcher stages to be attached and separated thereafter.

The main connecting elements of both elements 1 and 2, to each other, comprising a connecting layer 30 containing a connecting agent, placed between two connecting plates 10 and 20 which are respectively associated with the elements 1 and 2, and more accurately between connecting surfaces 12 and 22 of the connecting plates 10 and 20. Bolts 40 enable each of the elements 1 and 2 to be secured with their respective connecting plate 10 and 20. The layer 30 of connecting means can comprise glue or soldering.

The lines A-A and B-B of FIG. 2 explain the cross-sections represented by FIGS. 3A and 3B. Indeed, the line A-A intersects the structure by passing through an element of attachment by bolting, that is, a screw 40. Thus, along the entire structure to be maintained, assembled, and then separated, are a plurality of attachment elements, such as two screws 40 each screwed through one of both elements 1 or 2, against which the screw head presses. Securing these screws 40 is carried out in nuts 41 incorporated and enclosed in the connecting plates 10 and 20, by virtue of a recess.

It is noted that the connecting plate 10 has a first land 14 laterally extending with respect to the direction of the structures of the elements 1 and 2, thus pressing against one end of the other connecting plate 20. Indeed, in the case of an aeronautic, or even spatial, launcher, the tangential forces between the elements 1 and 2 can be very significant. Consequently, to complete the connection function of the connecting element of the connecting layer 30, the land 14 of the first connecting plate 10 enables most of the longitudinal strains transmitted between both elements 1 and 2 to be uptaken.

The line B-B does not intersect these attachment elements. Thus, FIG. 3B only represents the head of both screws 40 which project from the entire structure.

The assembly according to the invention is completed by a thermal layer 15 comprising thermite, placed on a thermal surface 16 of the first connecting part 10, and opposite to the connecting surface 12 (definition of thermite: a mixture of a metal fuel that can often be aluminum, but not only, and an oxidant, often a metal oxidant). It is set out that the term "thermite" encompasses herein nanothermites. The thermal layer 15 is inflamed by an electrical command from an electrical control connection 60. This thermal layer 15 is covered with a heat protecting plate 17, placed between two second lands 19 of the first connecting part 10, on the side of the first element 1.

This heat protecting plate 17 is itself covered with a cap 18 for compressing all the thermal layer 15 and its heat protecting plate 17. A seal can possibly ensure sealing with respect to the first connecting part 10. Finally, the cap 18 is itself enclosed between both second lands 19, by virtue of the first element 1.

Figure 4:
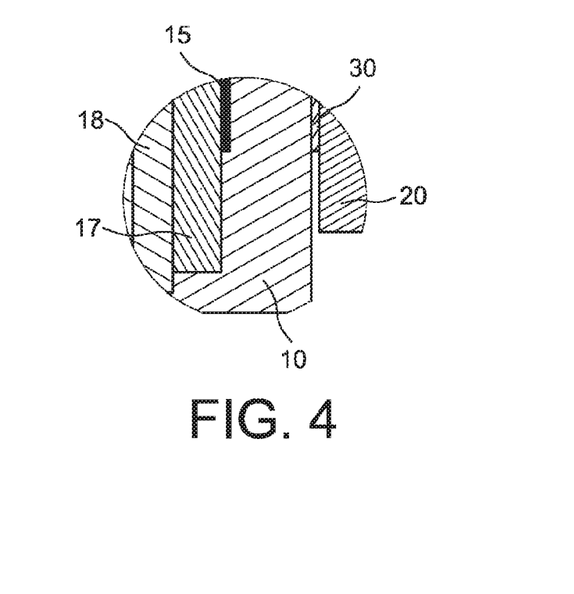
FIG. 4, in cross-section, a detail of the device according to the invention, in this first embodiment.

FIG. 4 shows in detail this stack of different parts and layers.

Figure 5A:
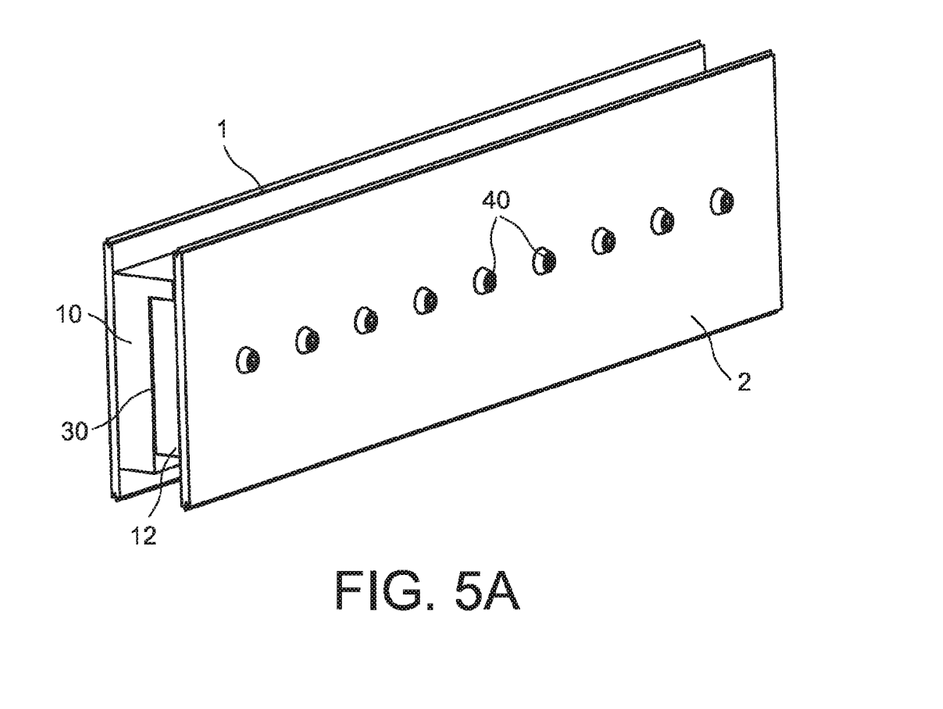
FIGS. 5A and 5B, in isometric view, the device according to the invention, in this first embodiment.

FIG. 5A shows the assembly in a perspective view, in particular the element 1, the first connecting part 10, the connecting layer 30, the second connecting part 12, the second element 2, and the head of the screws 40.

Figure 5B:
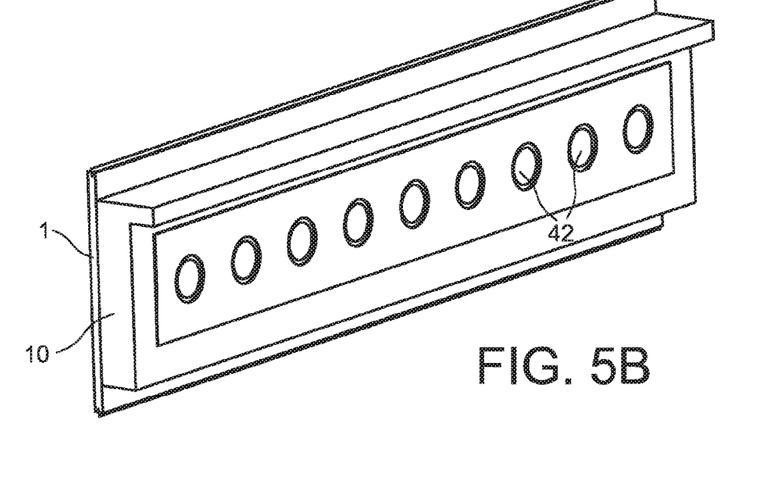

FIG. 5B shows, in a perspective view, all the element 1, the first connecting part 10, the second element 2, and the second connecting part 12 having been removed. There can be seen holes 42 provided through the first connecting part 10, enabling bolting elements to pass therethrough.

The second embodiment of the invention is illustrated by the following figures.

Figure 6A:
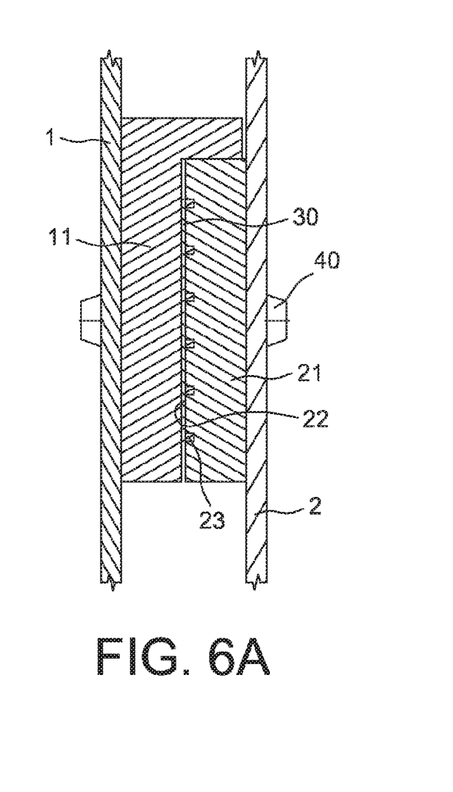
FIGS. 6A and 6B, two cross-sections of the device according to the invention, in a second embodiment of the invention.
Figure 6B:
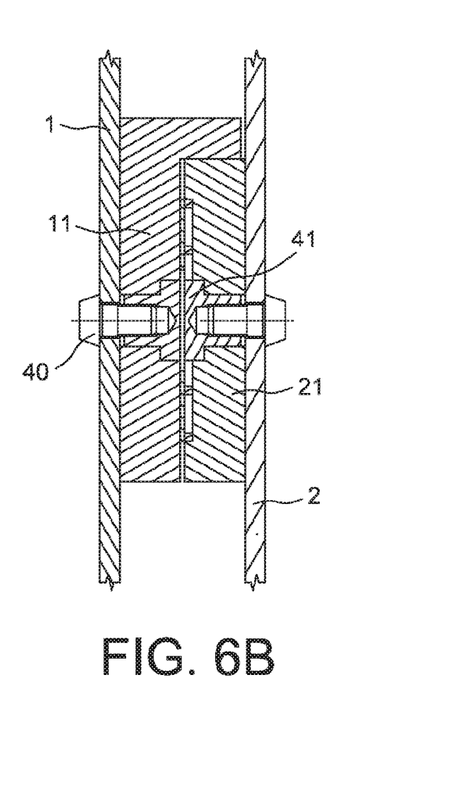

FIGS. 6A and 6B show, in a cross-section, this second embodiment which comprises fewer elements than the first one. There is found both elements 1 and 2, which enclose their respective two connecting parts 11 and 21. The screws 40 and their nuts 41 are also represented. The difference between this embodiment and the first one resides in the fact that the thermite 24 is placed in grooves 23, machined on the connecting surface 22 of the second connecting part. Thus, the connecting layer 30 is in direct contact with the thermite which has to melt it.

Figures 7, 8A, 8B:
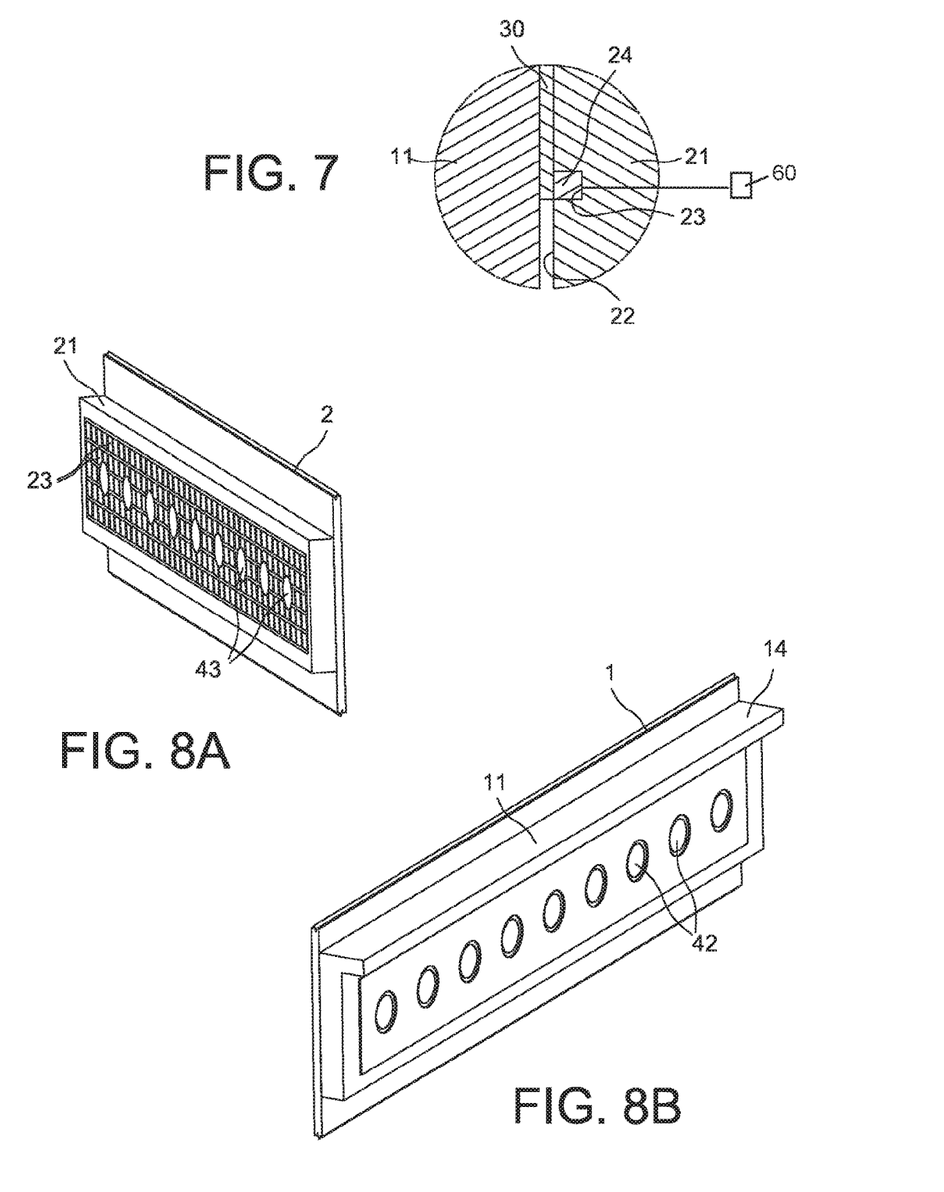
FIG. 7, in cross-section, a detail of the device according to the invention, in this second embodiment of the invention.
FIGS. 8A and 8B, in isometric view, the device according to the invention, in this second embodiment of the invention.

FIG. 7 shows, in cross-section, the detail of this specificity, that is, the thermite 24, placed in a groove 23, provided on the connecting surface 22 of the second connecting part 21. The connecting layer 30, as well as the first connecting part 11, are also represented. To separate the elements 1 and 2, the connecting layer 30 placed between both connecting plates 10 and 20 or the thermite 24 placed in the groove 23 should be destroyed. Remote pyrotechnical triggering by the electrical control connection 60 is thereby used.

FIG. 5A can be used to show that the external appearance of this second embodiment is analogous to the first embodiment.

FIG. 8A shows, in a perspective view, the element 2 and the second connecting part 21, on the connecting surface 22 from which the grooves 23 are provided. It is seen that these grooves 23 can be machined along two perpendicular directions to enable the placement of sufficient thermite for melting the connecting layer 30. Holes 43 passing through the second connecting plate 21 and the element 2 are also visible, they enable the bolting elements to be passed therethrough.

FIG. 8B shows, in a perspective view, the other part of the assembly, that is, the element 1 and the second connecting part 11 with its inner land 14 and its holes 42.

The elements 1 and 2 are, in the preferential application of the invention, for the first element 1, an aerospace or aeronautic launcher stage with a rank n, on the end of which is attached the second element 2, which is either a second launcher stage with the rank n+1, of the launcher, or an operational load, for example containing equipment or a facility to be put into orbit.

To immobilize both elements 1 and 2, the latter are brought to the melting temperature of the solder or glue used for this assembly. For example, if these structures to be assembled are made of titanium and if the solder chosen is a silver alloy, the entire zone to be assembled is brought to the melting temperature of the silver alloy, that is, about 960° C. For this, several conventional methods are chosen, for example, induction soldering, oven heating soldering, under a neutral atmosphere, or resistance soldering. For the assembly described by the present invention, it is noted that induction soldering or resistance soldering is more suitable for high volumes. Once the soldering is carried out, the heating means are removed and the connection is operational thereafter.

The thermite making up the heating means is preferably sheathed thermite. This type of material, by an exothermal oxidoreduction reaction, produces temperatures in the order of 1800°, that is, between 1230° C. to 5770° C. for nano-thermites. It is set out that devices according to the invention are placed surrounding the entire connection, that is, on the periphery of the assembly of the first element 1 and the second element 2, preferably an aeronautic launcher.

In the case of two elements of an aerospace launcher, the first element 1 and the second element 2 are intentionally placed under pressure. Hence, when pyrotechnically triggered, they will move away from each other, under the so-called champagne cork effect, along the linear axis of the assembly. In the case where there is no pressure inside both these elements, or between the structures, the distancing can be made by any other known means such as springs, distancing rockets, pneumatic means or the like.

After the first element and the second element are disengaged, the internal structure of the second element has again a surface with neither protuberance, nor pull-out.

Moreover, the invention meets a provision of Article 5 of the Space Operations Act (SOA), relating to the Satellite Lunching Operators, in order to ensure the environment protection of the outer space, in particular for restricting risks related to space debris. While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise.

This disclosure hereby incorporates by reference the complete disclosure of any patent or application from which it claims benefit or priority.

The invention claimed is:

1. A device for connecting and separating a first element and a second element, the device comprising:
a first connecting plate attached to the first element and a second connecting plate attached to the second element, wherein the first connecting plate has a first connecting surface on a first side and a thermal surface on a second side opposite to the first side, wherein the thermal surface faces the first element, and wherein the second connecting plate has a second connecting surface facing the first connecting surface;
a connecting layer comprising solder or glue placed between the first and second connecting surfaces so as to define a local connection of the first element to the second element;
thermite, placed on the thermal surface, close to the connecting layer; and
an electrical control configured to remotely pyrotechnically trigger the thermite, to securely separate the first element from the second element by a warming-up.

2. The device according to claim 1, wherein a heat protecting plate, as well as a cap, are placed between the first connecting plate, carrying the thermite, and the first element.

3. The device according to claim 2, wherein the first connecting plate has a first land, laterally extending on the first side by pressing against one end of the second connecting plate, and two second lands laterally extending on the second side, to surround the heat protecting plate and the cap.

4. The device according to claim 1, wherein the first and second connecting plates are respectively attached to the first and second elements by bolting.

5. An aeronautic or aerospace launcher comprising a plurality of devices according to claim 1, the aeronautic or aerospace launcher further comprising:
a first launcher stage, and,
a second launcher stage or an operational load, carried by the first launcher stage,
wherein the first element for each device of the plurality of devices is a wall of the first launcher stage, and
wherein the second element for each device of the plurality of devices is a wall of the second launcher stage or the operational load, and
wherein the devices of the plurality of devices are distributed over an entire circumference of the launcher to secure and separate the second launcher stage or the operational load from the first launcher stage.

6. A device for connecting and separating a first element and a second element, the device comprising:
a first connecting plate attached to the first element and a second connecting plate attached to the second element, wherein the first connecting plate has a first connecting surface, wherein the second connecting plate has a second connecting surface facing the first connecting surface, and wherein grooves are provided on the second connecting surface;
a connecting layer comprising solder or glue placed between the first and second connecting surfaces so as to define a local connection of the first element to the second element;
thermite, placed in the grooves, close to the connecting layer; and an electrical control configured to remotely pyrotechnically trigger the thermite, to securely separate the first element from the second element by a warming-up.

7. The device according to claim 6, wherein the first connecting plate has a land laterally extending to press against one end of the second connecting plate.

8. The device according to claim 6, wherein the first and second connecting plates are respectively attached to the first and second elements by bolting.

9. An aeronautic or aerospace launcher comprising a plurality of devices according to claim 6, the aeronautic or aerospace launcher further comprising:
   a first launcher stage, and,
   a second launcher stage or an operational load, carried by the first launcher stage,
   wherein the first element for each device of the plurality of devices is a wall of the first launcher stage, and
   wherein the second element for each device of the plurality of devices is a wall of the second launcher stage or the operational load, and
   wherein the devices of the plurality of devices are distributed over an entire circumference of the launcher to secure and separate the second launcher stage or the operational load from the first launcher stage.

10. A method for connecting and separating a first element and a second element, wherein a first connecting plate is attached to the first element and a second connecting plate is attached to the second element, wherein the first connecting plate has a first connecting surface, wherein the second connecting plate has a second connecting surface facing the first connecting surface, and wherein grooves are provided on the second connecting surface,
   the method comprising:
   connecting the first and second connecting plates together by soldering or gluing by means of a connecting layer placed between the first and second connecting surfaces, so as to define a local connection of the first element to the second element, wherein thermite, inflammable by an electrical control connection, is placed in the grooves, close to the connecting layer; and
   remotely pyrotechnically triggering the thermite to cause, only by its warming-up, the quick warming-up and destruction of the connecting layer, to securely separate the first element from the second element.

* * * * *